US 011182651B2

(12) United States Patent
Lee et al.

(10) Patent No.: US 11,182,651 B2
(45) Date of Patent: Nov. 23, 2021

(54) METHOD AND APPARATUS FOR HIGH SPEED OBJECT DETECTION USING ARTIFICIAL NEURAL NETWORK

(71) Applicant: ELECTRONICS AND TELECOMMUNICATIONS RESEARCH INSTITUTE, Daejeon (KR)

(72) Inventors: Seung Jae Lee, Daejeon (KR); Jong Gook Ko, Daejeon (KR); Keun Dong Lee, Daejeon (KR); Su Woong Lee, Sejong-si (KR); Won Young Yoo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 117 days.

(21) Appl. No.: 16/702,721

(22) Filed: Dec. 4, 2019

(65) Prior Publication Data
US 2020/0272863 A1 Aug. 27, 2020

(30) Foreign Application Priority Data
Feb. 22, 2019 (KR) .................. 10-2019-0021310

(51) Int. Cl.
*G06K 9/62* (2006.01)
*G06N 3/04* (2006.01)
*G06N 3/08* (2006.01)

(52) U.S. Cl.
CPC ............. *G06K 9/6267* (2013.01); *G06N 3/04* (2013.01); *G06N 3/08* (2013.01)

(58) Field of Classification Search
CPC .......... G06K 9/6267; G06N 3/04; G06N 3/08
See application file for complete search history.

(56) References Cited

U.S. PATENT DOCUMENTS

| 2015/0235105 | A1 | 8/2015 | Han et al. |
| 2017/0140269 | A1 | 5/2017 | Schaul et al. |
| 2018/0121762 | A1* | 5/2018 | Han ................. G06K 9/4671 |
| 2018/0129935 | A1 | 5/2018 | Kim et al. |
| 2018/0137406 | A1 | 5/2018 | Howard et al. |

(Continued)

FOREIGN PATENT DOCUMENTS

| KR | 10-1828011 B1 | 2/2018 |
| KR | 10-2018-0065866 A | 6/2018 |
| WO | 2016/033506 A1 | 3/2016 |

OTHER PUBLICATIONS

Howard, Andrew G., et al. "Mobilenets: Efficient convolutional neural networks for mobile vision applications." arXiv preprint arXiv: 1704.04861 (2017). (Year: 2017).*

(Continued)

*Primary Examiner* — Utpal D Shah
(74) *Attorney, Agent, or Firm* — LRK Patent Law Firm

(57) ABSTRACT

A fast object detection method and a fast object detection apparatus using an artificial neural network. The fast object detection method includes obtaining an input image; inputting the obtained input image into an object detection neural network using a plurality of preset bounding boxes; and detecting an object included in the input image by acquiring output data of the object detection neural network.

18 Claims, 8 Drawing Sheets

(56) References Cited

U.S. PATENT DOCUMENTS

2018/0157938 A1* 6/2018 Wang .................. G06N 3/0454
2018/0225563 A1 8/2018 Kim et al.

OTHER PUBLICATIONS

Wei Liu et al., "SSD: Single Shot Multibox detector", Springer International Publishing AG 2016.
Mark Sandler et al., "MobileNetV2 Inverted Residuals and Linear Bottlenecks", 2018 IEEE Conference on Computer Vision and Pattern Recognition.
Sergei Alyamkin et al., "2018 Low-Power Image Recognition Challenge", Workshop in 2018 CVPR.
Seung Jae Lee et al., "Object detection method efficient in memory and computation amount", IPIU 2019, Feb. 2019.

* cited by examiner

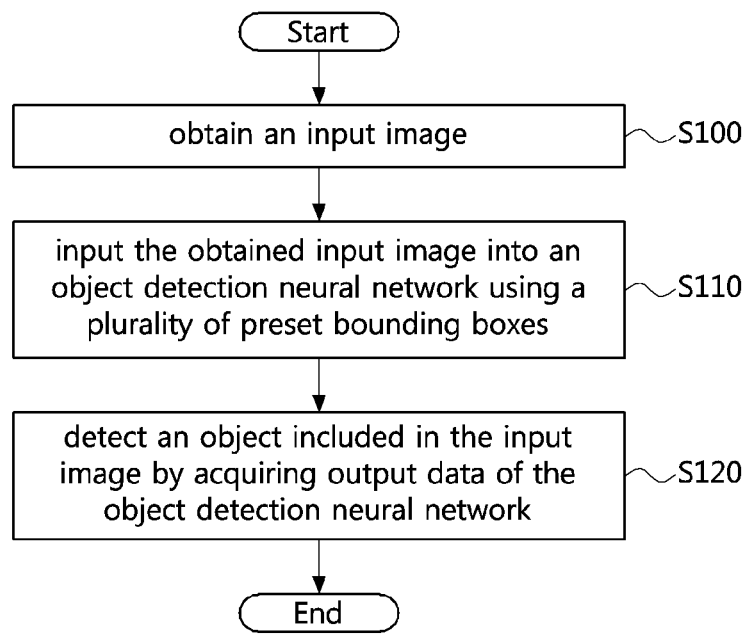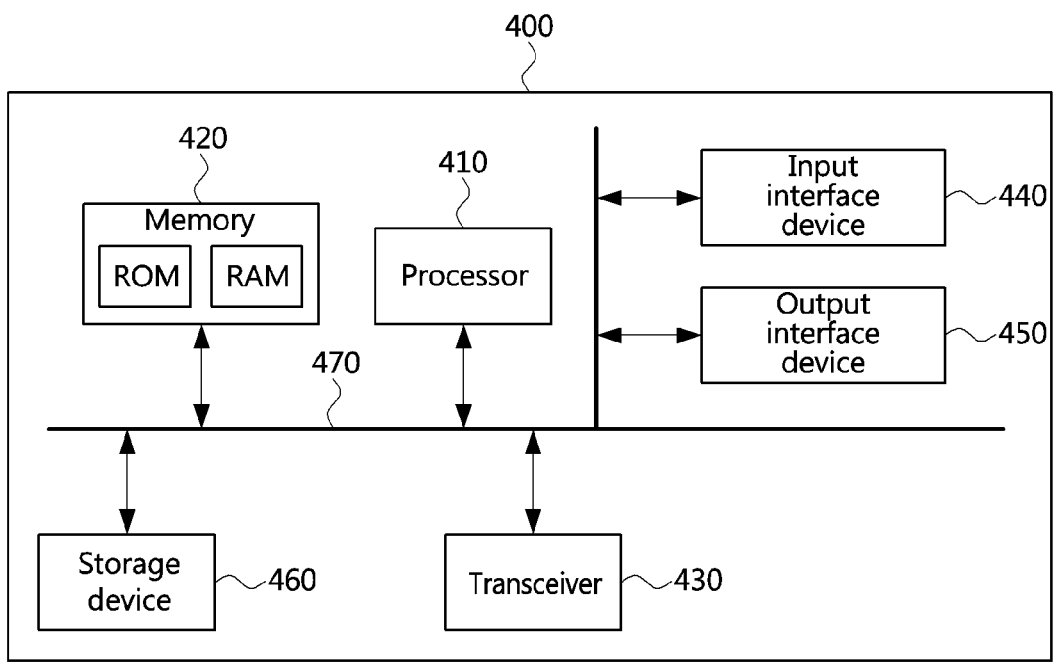

METHOD AND APPARATUS FOR HIGH SPEED OBJECT DETECTION USING ARTIFICIAL NEURAL NETWORK

CROSS-REFERENCE TO RELATED APPLICATION

This application claims priority to Korean Patent Application No. 10-2019-0021310 filed on Feb. 22, 2019 in the Korean Intellectual Property Office (KIPO), the entire content of which is hereby incorporated by reference.

BACKGROUND

1. Technical Field

The present disclosure relates to a method and an apparatus for high speed object detection using an artificial neural network, and more specifically, to a technique for detecting an object by using an artificial neural network capable of improving a computation speed in a single-stage based object detection network using a plurality of preset bounding boxes.

2. Description of Related Art

The object detection technique is a key technique that is widely used in many applications such as robots, video surveillance, and vehicle safety. Recently, as a method of using an artificial neural network or a convolutional neural network (CNN) in the object detection techniques has been known, the object detection technique using a single image has developed remarkably.

The object detection technique is a technique of identifying an object according to a specific location within an image. Unlike the object classification technique, the object detection technique should simultaneously estimate the location and identification of the object and identify all objects to be detected within the image.

The object detection method using the CNN may be classified into a technique based on region extraction (i.e., region of interest (RoI) pooling) and a technique based on grid cells. In the method based on region extraction, a feature map for an entire input image may be extracted using a CNN, a candidate region (i.e., region proposal) may be extracted from the extracted feature map, and an object may be identified by resampling and classifying features or pixels for the candidate region.

On the other hand, in the existing technique based on region extraction, it is necessary to estimate the sizes and locations of bounding boxes in order to detect objects having different sizes within one feature map, and thus a big slowdown may occur. Accordingly, there is a need for a method capable of detecting an object at high speed in the object detection method using the CNN.

SUMMARY

Accordingly, exemplary embodiments of the present disclosure provide a method for high speed object detection using an artificial neural network. Accordingly, exemplary embodiments of the present disclosure also provide an apparatus for high speed object detection using an artificial neural network.

In order to achieve the objective of the present disclosure, a fast object detection method using an artificial neural network may comprise obtaining an input image; inputting the obtained input image into an object detection neural network using a plurality of preset bounding boxes; and detecting an object included in the input image by acquiring output data of the object detection neural network, wherein the object detection network includes a base network; additional layers for receiving an output of the base network; and detection layers for receiving outputs of the additional layers or the base network.

The base network may be one of VGG, ResNet, ResNeXt, and MobileNet.

The base network may include at least one 3×3 convolutional layer and at least one 2×2 maxpooling layer.

The base network may further include at least one 3×3 depthwise convolutional layer receiving an output of the at least one 2×2 maxpooling layer and at least one 1×1 convolutional layer receiving an output of the at least one 3×3 depthwise convolutional layer.

The additional layers may include at least one 3×3 depthwise convolutional layer and at least one 1×1 convolutional layer connected to an output of the at least one 3×3 depthwise convolutional layer.

The detection layers may include at least one 1×1 convolutional layer detecting a location of the object and at least one 1×1 convolutional layer identifying a type of the object.

In the at least one 3×3 depthwise convolutional layer, a stride value, which is an interval at which convolution is performed, may be set to 2.

The additional layers may include a first additional layer receiving an output of the base network and extracting a feature, and a second additional layer receiving an output of the first additional layer and extracting a feature.

The detection layers may include a first detection layer receiving the output of the base network and identifying a location and a type of the object, and a second detection layer receiving an output of the first additional layer and identify the location and the type of the object.

The first additional layer may include at least two structures each of which has a structure configured by a 3×3 depthwise convolutional layer and a 1×1 convolutional layer connected to an output of the 3×3 depthwise convolutional layer.

In order to achieve the objective of the present disclosure, a fast object detection apparatus using an artificial neural network may comprise at least one processor and a memory storing at least one instruction executable by the at least one processor, wherein when executed by the at least one processor, the at least one instruction may configure the at least one processor to obtain an input image; input the obtained input image into an object detection neural network using a plurality of preset bounding boxes; and detect an object included in the input image by acquiring output data of the object detection neural network, and wherein the object detection network may include a base network; additional layers for receiving an output of the base network; and detection layers for receiving outputs of the additional layers or the base network.

The base network may be one of VGG, ResNet, ResNeXt, and MobileNet.

The base network may include at least one 3×3 convolutional layer and at least one 2×2 maxpooling layer.

The base network may further include at least one 3×3 depthwise convolutional layer receiving an output of the at least one 2×2 maxpooling layer and at least one 1×1 convolutional layer receiving an output of the at least one 3×3 depthwise convolutional layer.

The additional layers may include at least one 3×3 depthwise convolutional layer and at least one 1×1 convolutional layer connected to an output of the at least one 3×3 depthwise convolutional layer.

The detection layers may include at least one 1×1 convolutional layer detecting a location of the object and at least one 1×1 convolutional layer identifying a type of the object.

In the at least one 3×3 depthwise convolutional layer, a stride value, which is an interval at which convolution is performed, may be set to 2.

The additional layers may include a first additional layer receiving an output of the base network and extracting a feature, and a second additional layer receiving an output of the first additional layer and extracting a feature.

The detection layers may include a first detection layer receiving the output of the base network and identifying a location and a type of the object, and a second detection layer receiving an output of the first additional layer and identify the location and the type of the object.

The first additional layer may include at least two structures each of which has a structure configured by a 3×3 depthwise convolutional layer and a 1×1 convolutional layer connected to an output of the 3×3 depthwise convolutional layer.

Using the method and apparatus for fast object detection using the artificial neural network according to the exemplary embodiments of the present disclosure as described above, efficient object detection may be possible in terms of memory size and computation amount. In addition, the larger the number of objects to be detected and the number of candidates to be classified, there is an advantage that the objects can be detected at a faster speed than the conventional method. In addition, the objects can be detected quickly, even on hardware devices with low memory and computational power.

BRIEF DESCRIPTION OF DRAWINGS

Embodiments of the present disclosure will become more apparent by describing in detail embodiments of the present disclosure with reference to the accompanying drawings, in which:

FIG. 10 is a flowchart illustrating a fast object detection method using an artificial neural network according to an exemplary embodiment of the present disclosure; and FIG. 11 is a block diagram of a fast object detection apparatus using an artificial neural network according to an exemplary embodiment of the present disclosure.

DETAILED DESCRIPTION

Figure 1:
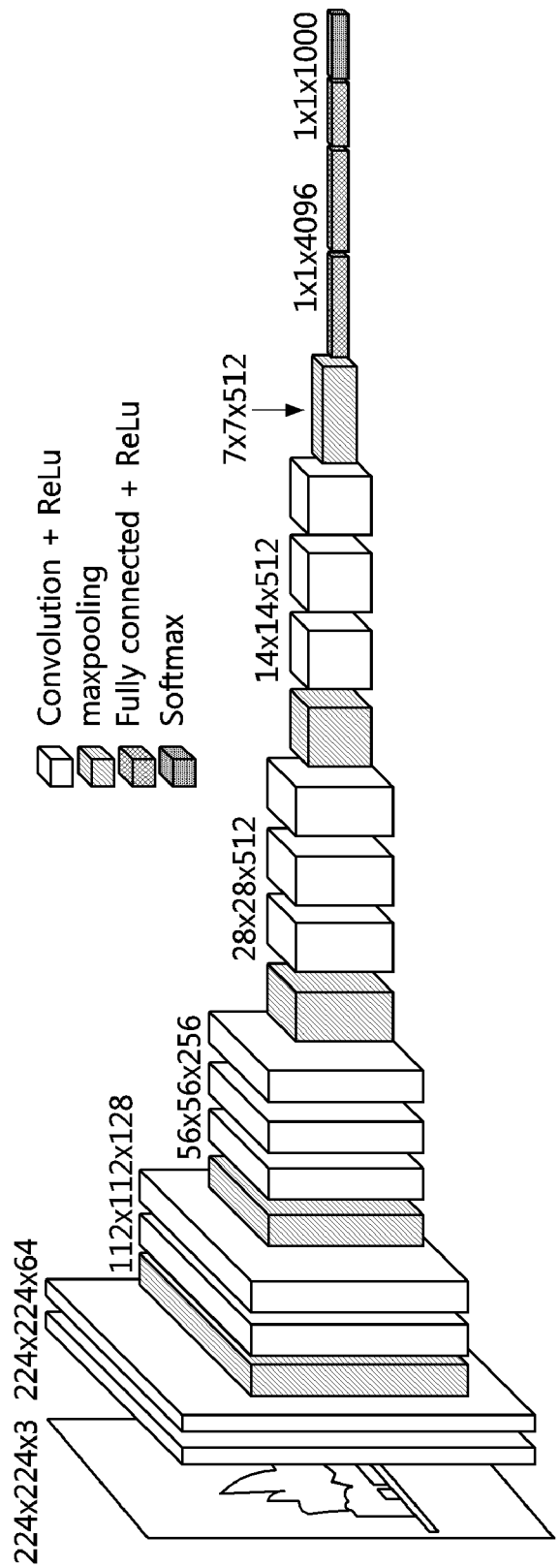
FIG. 1 is an exemplary diagram for explaining a base network structure used for object detection.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is an exemplary diagram for explaining a base network structure used for object detection.

As shown in FIG. 1, it can be seen a structure of a base network commonly used for object detection. In more detail, the base network for object detection may include convolutional layers for receiving an image of a preset size as an input image and extracting a feature map, pooling layers for performing sampling on the extracted feature, and the like.

The convolutional layers may include at least one of a filter for extracting the feature of the input image, an activation function for changing a value of the filter into a nonlinear value, and a pooling layer. The filter may be a function that detects a characteristic part of the input image represented as a matrix, and may be generally represented as a matrix. Here, the feature of the object may be extracted through convolution of the input image and the filter represented as the matrixes, where the extracted feature may be referred to as the feature map. In addition, an interval at which the convolution is performed may be referred to as a stride. The feature map having a different size may be extracted according to the stride. Here, if the size of the filter is smaller than the size of the input image, the size of the feature map is smaller than that of the input image. In order to prevent the feature from being lost through several stages, a padding process may be further performed. Here, the padding process may be a process of maintaining the size of the feature map to be the same as the size of the input image by adding a preset value (e.g., 0) to the outside of the generated feature map.

The activation function may be a function for converting the feature extracted as a value (or matrix) into a nonlinear value, and sigmoid function, ReLU function, Softmax function, and the like may be used as the activation function. For example, the Softmax function may be a function having a property that normalizes all input values to a value between 0 and 1 and maintains a sum of output values always as 1.

The pooling layer may be a layer that selects a feature representative of the feature map by performing subsampling or pooling on the extracted feature map. In the pooling layer, maxpooling for extracting the largest value for a certain region of the feature map, average pooling for extracting an average value, and the like may be performed. In this case, the pooling layer may be optionally performed instead of necessarily performed after the activation function.

Referring to FIG. 1, a neural network structure of a commonly used VGG16 may be identified. In the VGG16, a process, in which a feature map is extracted from an input image of 224×224 size by using convolutional layers and the ReLU function and the extracted feature map is converted into a smaller feature map by performing the maxpooling on the extracted feature map, may be repeatedly performed, and probabilities for 1000 labels may be finally obtained through a fully connected layer and the Softmax function.

Here, the existing VGG is given as an example, but a residual neural network (ResNet), an aggregated residual transformations for deep neural network (ResNeXt), a MobileNets, or the like may be used in the base network. Also, since the structure and operation of the base network will be easily understood by those skilled in the art to which the present disclosure pertains, a detailed description thereof will be omitted.

Also, an image used as the input data in the present disclosure may be referred to as a still image, a picture, a video, an image, and the like.

Figure 2:
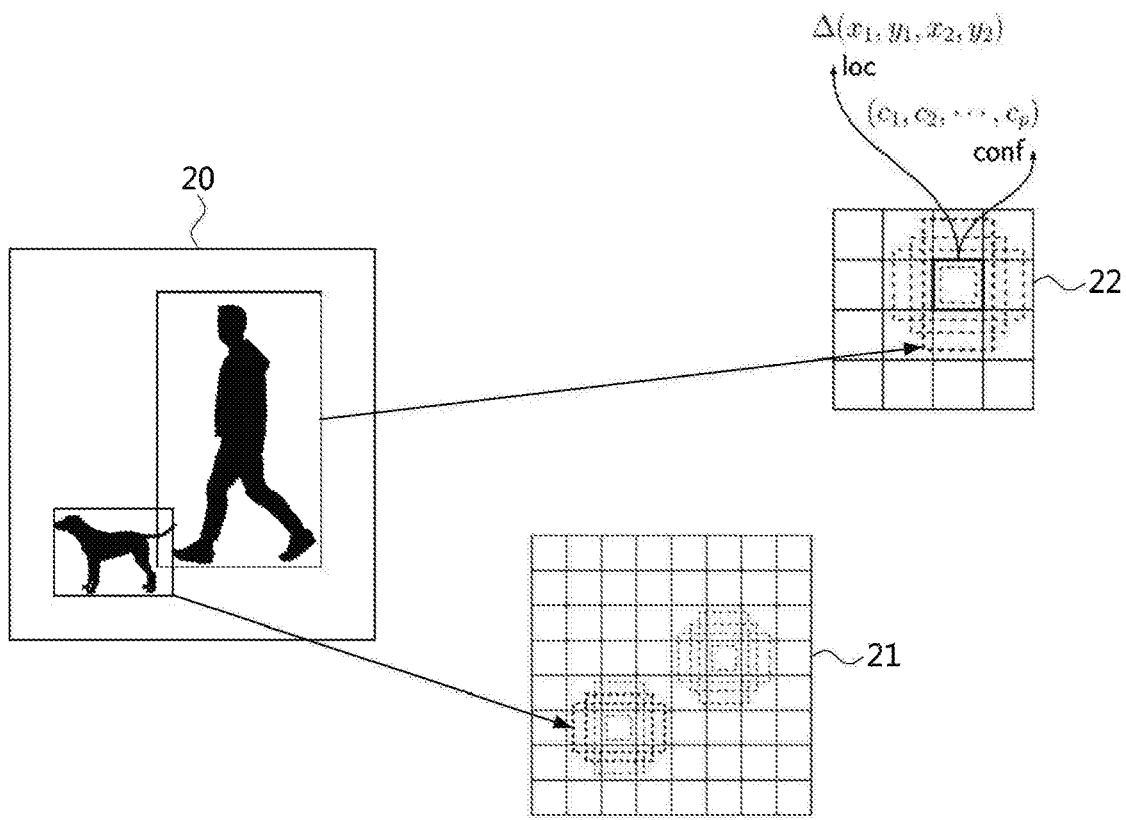
FIG. 2 is an exemplary diagram for explaining a principle of a single shot multibox detector (SSD) in which additional layers are combined for object detection according to an exemplary embodiment of the present disclosure.

FIG. 2 is an exemplary diagram for explaining a principle of a single shot multibox detector (SSD) in which additional layers are combined for object detection according to an exemplary embodiment of the present disclosure.

The network according to FIG. 1 is used to extract the feature from one image. In order to detect an object from the input image, an input image having a different size should be input or a module capable of detecting a candidate region (or, bounding box) with respect to the extracted feature should be additionally trained. As a solution to this problem, a method of improving a detection speed may be considered by omitting a training process of the module for detecting a bounding box (or, candidate region) and using a preset candidate region.

Referring to a reference numeral 20 of FIG. 2, it can be seen that there are two objects having different sizes in one still image. In this case, when two objects are respectively detected in one feature map, since the size of the bounding box (or candidate region) should be set differently according to the object, a process of estimating the size of the bounding box and estimating the location of the bounding box may be additionally required. In this case, a plurality of feature maps may be generated to have different sizes, a small object may be detected in a feature map in which respective cells (or blocks) are segmented to have small sizes and a large object may be detected in a feature map in which respective cells are segmented to have large sizes, thereby improving the detection speed.

Referring to a reference numeral 21, a feature map having a size of 8×8 may be identified, and referring to a reference numeral 22, a feature map having a size of 4×4 may be identified. In this case, referring to the reference numeral 22, the object may be identified by estimating confidence levels (i.e., conf) for all object categories ($c_1$, $c_2$, $c_3$, $c_p$), and an offset value indicating a relative location and size that the bounding box can have for each cell. In this case, the SSD may preset a plurality of aspect ratios that the bounding box can have, and estimate the bounding box having a size corresponding to the object from among the bounding boxes having the preset plurality of aspect ratios.

Here, the object detection method including the training method of the SSD is described in a previous paper (e.g., W. Liu, D. Anguelov, D. Erhan, C. Szegedy, and S. E. Reed, 'SSD: single shot multibox detector', CoRR, abs/1512.02325, 2015), and it can be easily understood by those skilled in the art, detailed description thereof will be omitted.

Since the SSD is a scheme of omitting the process of learning and detecting the candidate region and identifying the type and location of the object using predefined bounding boxes, the SSD may be an example of a single-stage object detection technique. However, the existing single-stage object detection technique may also cause slowness and memory shortage due to the use of many bounding boxes.

Therefore, the following describes a fast object detection method using an artificial neural network according to an exemplary embodiment of the present disclosure in order to improve the detection speed according to the single-stage scheme and use less memory.

Figure 3:
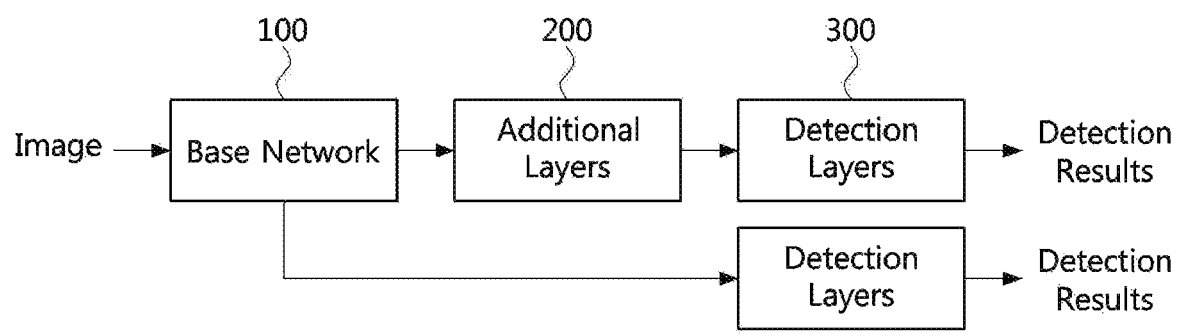
FIG. 3 is an exemplary diagram for describing a network structure applied to an object detection method according to a single-stage scheme.
Figure 4:
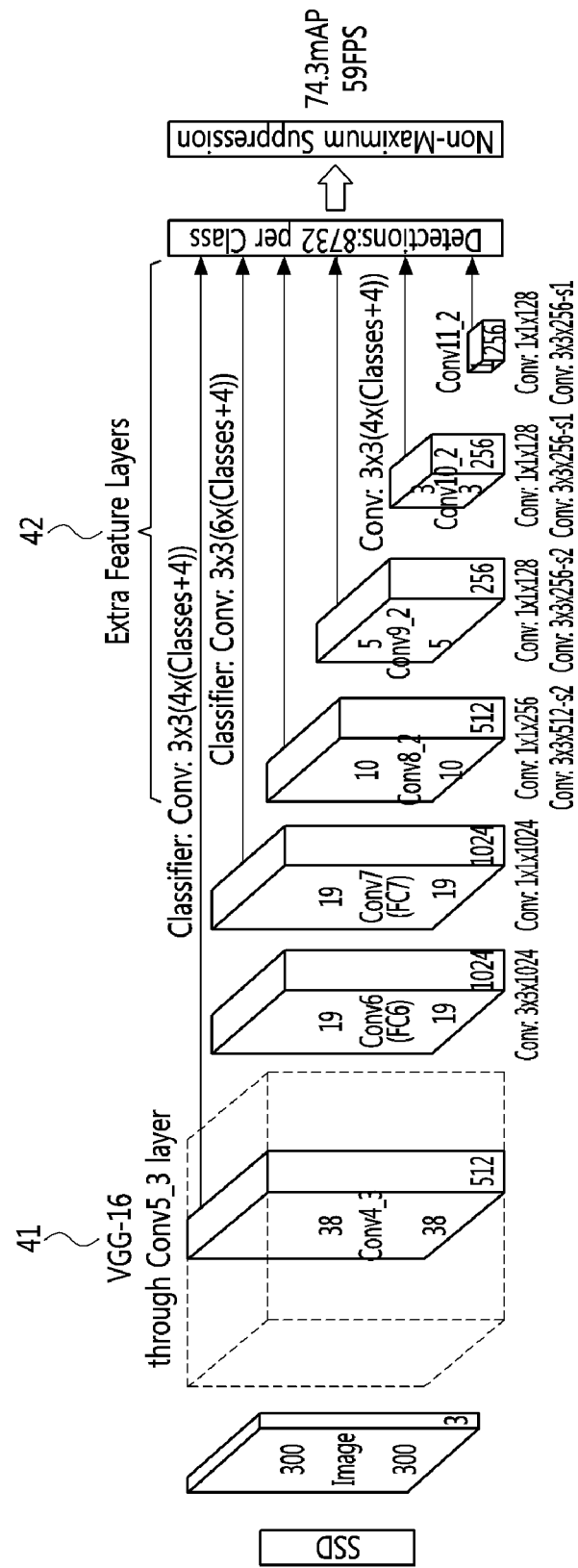
FIG. 4 is a diagram illustrating a network implementation example of a single shot multibox detector (SSD) according to FIG. 2.

FIG. 3 is an exemplary diagram for describing a network structure applied to an object detection method according to a single-stage scheme. FIG. 4 is a diagram illustrating a network implementation example of a single shot multibox detector (SSD) according to FIG. 2.

Referring to FIG. 3, a network structure applied to the object detection method according to the single-stage scheme may include a base network 31, additional layers 32 for receiving outputs of the base network, and two or more detection layers 33 for receiving outputs of the additional layers 32 and the outputs of the base network 31, respectively.

Therefore, in the object detection method according to the single-stage scheme, a feature map obtained by passing through the base network may be passed through the additional layers that additionally extract feature maps of different sizes, and then objects may be finally detected by passing them through the plurality of detection layers 33 that determine the location and classification of the object using the feature transferred from the additional layers and the base network.

Meanwhile, referring to FIG. 4, the SSD described with reference to FIG. 2 may have the VGG16 described in FIG. 1 as the base network, and may include a plurality of additional layers (i.e., extra feature layers) and detection layers having different sizes at a back end of the base network. In this case, in a notation format of the convolutional layer, for example, 3×3×102 may mean that the size is 3×3 and the number of channels is 1024.

In detail, the SSD according to FIG. 4 may use 1×1 convolutional layers and 3×3 convolutional layers, which are sequentially connected, as the additional layers, and may use 3×3 convolutional layers as the detection layers.

Meanwhile, since the general convolutional layer performs convolution operations while traversing the entire map, the amount of computation is very large. To solve this problem, a depthwise separable convolution may be used. The depthwise separable convolution is a depthwise convolution. The depthwise separable convolution performs convolution for each input layer channel and stores an output value, and aggregate data of each channel by performing 1×1 pointwise convolution on the stored output value for each channel, thereby producing outputs similar to those of the operation of general convolutional layer.

Hereinafter, SSDLite' may be a modified SSD scheme in which the additional layers are configured by using the above-described depthwise separable convolution to sequentially connect the 1×1 convolutional layer, the depthwise 3×3 convolutional layers, and the pointwise 1×1 convolutional layer.

Here, the depthwise 3×3 convolutional layer may mean a layer that performs convolution with a kernel (or filter) having a size of 3×3 in the spatial direction except the channel. The pointwise convolutional layer may be a layer that performs convolution with a kernel (or filter) having a size of 1×1 with respect to the channel direction, and may be referred to simply as '1×1 convolutional layer'.

Figure 5:
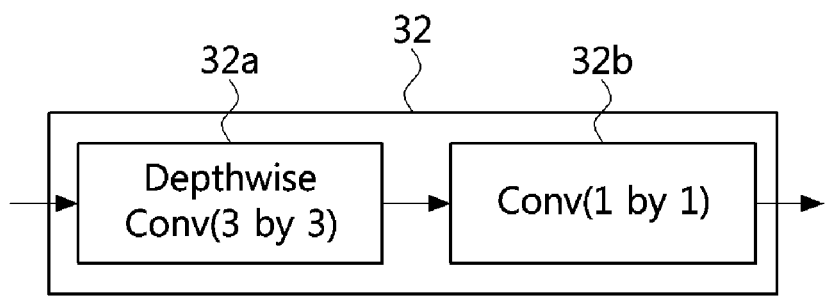
FIG. 5 is a block diagram of additional layers that can be used in a fast object detection method using an artificial neural network according to an exemplary embodiment of the present disclosure.

FIG. 5 is a block diagram of additional layers that can be used in a fast object detection method using an artificial neural network according to an exemplary embodiment of the present disclosure.

Referring to FIG. 5, in an exemplary embodiment of the present disclosure, the additional layers 32 of FIG. 3 may be configured differently to further improve the detection speed in the object detection method of the single-stage scheme.

That is, the additional layers 32 according to an exemplary embodiment of the present disclosure may include depthwise a 3×3 convolutional layer 32a and a 1×1 convolutional layer 32b connected to outputs of the depthwise 3×3 convolutional layer 32a.

The feature of the image extracted using the additional layers may be learned through the detection layer after configuring the candidate region by configuring the candidate region as a regular grid as in the conventional method in consideration of the size of the additional layers. The candidate region may be configured by utilizing a center value (e.g., k-means) of location information of the training data in the additional layer.

Figure 6:
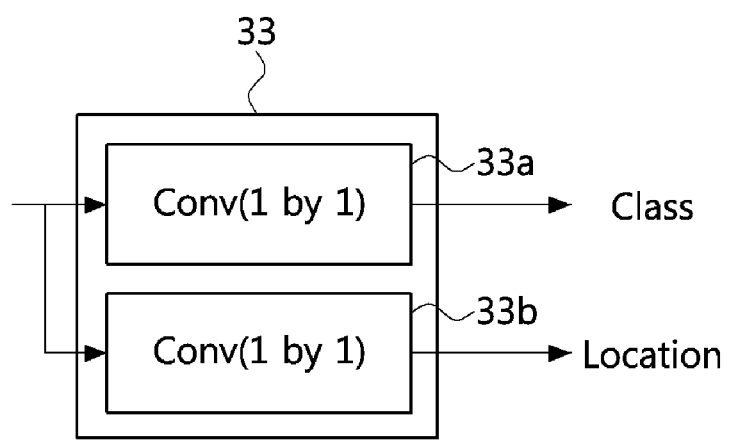
FIG. 6 is a block diagram of detection layers that may be used in a fast object detection method using an artificial neural network according to an exemplary embodiment of the present disclosure.

FIG. 6 is a block diagram of detection layers that may be used in a fast object detection method using an artificial neural network according to an exemplary embodiment of the present disclosure.

In an exemplary embodiment of the present disclosure, a 1×1 convolutional layer may be used as a layer for estimating a location and a classification in order to improve the detection speed in the object detection method of the single-stage scheme.

Specifically, in the detection layers 33 according to FIG. 3, as a layer for detecting a location of a searched object (or bounding box), a 1×1 convolutional layer 33a may be used. As a layer for identifying (or classifying) the searched object and detecting it, a 1×1 convolutional layer 33b may be used. That is, the layer for detecting the location of the object and the layer for identifying the object may be configured in parallel with each other.

The result of each additional layer and detection layer may be refined through NMS, soft-NMS, etc., which are already being utilized, by using classification accuracy and object detection information (BBOX).

In FIGS. 5 and 6, a plurality of additional layers and detection layers may be used, and the size and number of bounding boxes (or candidate regions) may vary according to the number of additional layers and detection layers.

Hereinafter, a network having a structure of the additional layers according to FIG. 5 and the detection layers according to FIG. 6 will be referred to as 'eSSD', and will be described in detail.

Figure 7:
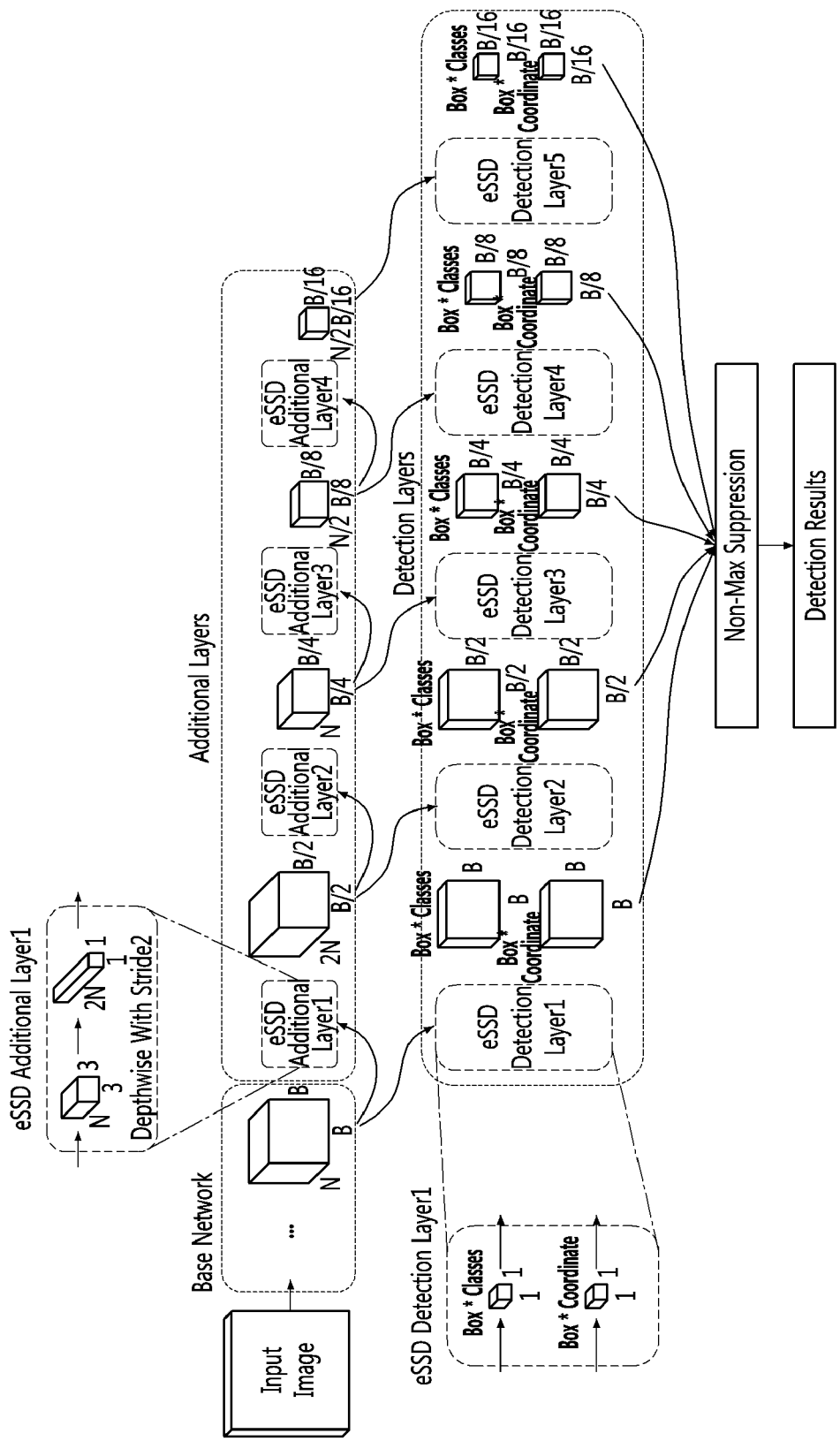
FIG. 7 is a block diagram of an object detection network including additional layers and detection layers according to a fast object detection method using an artificial neural network according to an exemplary embodiment of the present disclosure.

FIG. 7 is a block diagram of an object detection network including additional layers and detection layers according to a fast object detection method using an artificial neural network according to an exemplary embodiment of the present disclosure.

Referring to FIG. 7, an object detection network (eSSD) having additional layers and detection layers according to FIGS. 5 and 6 may be identified.

In the object detection network according to FIG. 7, after an input image is input to a base network, the input image may be delivered to additional layers and detection layers, respectively.

First, when the output image having N channels and a size of B×B is derived from the base network, the output image derived from the base network may be input to a first additional layer (i.e., eSSD Additional Layer1) and a first detection layer (e.g., eSSD Detection Layer1). The first detection layer (e.g., eSSD Detection Layer1) may derive the object location and the object classification result by using the 1×1 convolutional layer with respect to the output of the base network. That is, the first detection layer may be a layer that performs object location derivation and object classification by using the feature extracted by the base network.

When the output image having 2N channels and a size of (B/2)×(B/2) is derived from the first additional layer (i.e., eSSD Additional Layer1), the derived output image may be input to a second additional layer (i.e., eSSD Additional Layer2) and a second detection layer (i.e., eSSD Detection Layer2). The second detection layer (i.e., eSSD Detection Layer2) may derive the object location and the object classification result using a 1×1 convolutional layer with respect to the output of the first additional layer (i.e., eSSD Additional Layer1). That is, the second detection layer (i.e., eSSD Detection Layer2) may be a layer that performs object location derivation and object classification by using the feature extracted by the first additional layer (i.e., eSSD Additional Layer1).

When the output image having N channels and a size of (B/4)×(B/4) is derived from the second additional layer (i.e., eSSD Additional Layer2), the derived output image may be input to a third additional layer (i.e., eSSD Additional Layer3) and a third detection layer (i.e., eSSD Detection Layer3). The third detection layer (i.e., eSSD Detection Layer3) may derive the object location and the object classification result using a 1×1 convolutional layer with respect to the output of the second additional layer (i.e., eSSD Additional Layer2). That is, the third detection layer (i.e., eSSD Detection Layer3) may be a layer that performs object location derivation and object classification by using the feature extracted by the second additional layer (i.e., eSSD Additional Layer2).

When the output image having N/2 channels and a size of (B/8)×(B/8) is derived from the third additional layer (i.e., eSSD Additional layer3), the derived output image may be input to a fourth additional layer (i.e., eSSD Additional Layer4) and a fourth detection layer (i.e., eSSD Detection Layer4). The fourth detection layer (i.e., eSSD Detection Layer4) may derive the object location and the object classification result using a 1×1 convolutional layer with respect to the output of the third additional layer (i.e., eSSD Additional Layer3). That is, the fourth detection layer (i.e., eSSD Detection Layer4) may be a layer that performs object location derivation and object classification by using the feature extracted by the third additional layer (i.e., eSSD Additional Layer3).

When the output image having N/2 channels and a size of (B/16)×(B/16) is derived from the fourth additional layer (i.e., eSSD Additional Layer4), the derived output image may be input to a fifth detection layer (i.e., eSSD Detection Layer5). The fifth detection layer (i.e., eSSD Detection Layer5) may derive the object location and the object classification result using a 1×1 convolutional layer with respect to the output of the fourth additional layer (i.e., eSSD Additional Layer4). That is, the fifth detection layer (i.e., eSSD Detection Layer5) may be a layer that performs object location derivation and object classification by using the feature extracted by the fourth additional layer (i.e., eSSD Additional Layer4).

The first additional layer (i.e., eSSD Additional Layer1), the second additional layer (i.e., eSSD Additional Layer2), the third additional layer (i.e., eSSD Additional Layer3), and the fourth additional layer (i.e., eSSD Additional Layer4) may be respectively configured by sequentially connecting the 3×3 depthwise convolutional layer (here, stride thereof is 2) and the 1×1 convolutional layer. That is, each of the additional layers may have one or more structures each of which has the 3×3 depthwise convolutional layer (here, stride thereof is 2) and the 1×1 convolutional that are sequentially connected.

In addition, the first detection layer (i.e., eSSD Detection Layer1), the second detection layer (i.e., eSSD Detection Layer2), the third detection layer (i.e., eSSD Detection Layer3), the fourth detection layer (i.e., eSSD Detection Layer4), and the fifth detection layer (i.e., eSSD Detection Layer5) may be configured by connecting an object classification (e.g., Box class) layer consisting of the 1×1 convolutional layer and an object location detection (e.g., Box coordinate) layer consisting of the 1×1 convolutional layer in parallel.

From the first detection layer (i.e., eSSD Detection Layer1), the second detection layer (i.e., eSSD Detection Layer2), the third detection layer (i.e., eSSD Detection Layer3), the fourth detection layer (i.e., eSSD Detection Layer4), and the fifth detection layer (i.e., eSSD Detection Layer5), the object classification result (Box Classes, or object identification result) and the object location detection result (Box Coordinate, or location identification result of the bounding box) may be derived, respectively.

The object classification result and the object location detection result, which are derived from the first detection layer (i.e., eSSD Detection Layer1), the second detection layer (i.e., eSSD Detection Layer2), the third detection layer (i.e., eSSD Detection Layer3), the fourth detection layer (i.e., eSSD Detection Layer4), and the fifth detection layer (i.e., eSSD Detection Layer5), may be input to a non-max suppression layer. Here, the non-max suppression layer may derive a final result (i.e., detection result) by excluding a result whose probability value is not the maximum with respect to the object classification result and the object location detection result. For example, the non-max suppression layer may select the bounding box having the largest probability value among the bounding boxes overlapping the object in the image and exclude the remaining bounding boxes. Here, the final result may include a location value of the bounding box indicating the detected object and an identification value of the object in the bounding box.

In this case, the size and the number of channels in the results derived from each layer according to FIG. 7 should be interpreted to be changed according to data to be processed, and should not be interpreted as being limited to the values shown in the drawings. Also, the number of additional layers and the number of detection layers should also be interpreted as exemplary and may vary depending on implementation examples.

Table 1 below is a detailed example of a case of implementing the object detection network according to FIG. 7.

TABLE 1

| Layer No. | Type/Stride | Filters | Input size | Output size | Prediction filters |
|---|---|---|---|---|---|
| 1 | Conv/2 | 3 × 3 × 3 × 16 | 224 × 224 × 3 | 112 × 112 × 16 | |
| 2 | Maxpool/2 | 2 × 2 × 16 × 16 | 112 × 112 × 16 | 56 × 56 × 16 | |
| 3 | Conv(dw)/1 | 3 × 3 × 16dw | 56 × 56 × 16 | 56 × 56 × 16 | |
| 4 | Cony/1 | 1 × 1 × 16 × 48 | 56 × 56 × 16 | 56 × 56 × 48 | |

TABLE 1-continued

| Layer No. | Type/Stride | Filters | Input size | Output size | Prediction filters |
|---|---|---|---|---|---|
| 5 | Conv(dw)/2 | 3 × 3 × 48dw | 56 × 56 × 48 | 28 × 28 × 48 | |
| 6 | Cony/1 | 1 × 1 × 48 × 128 | 28 × 28 × 48 | 28 × 28 × 128 | |
| 7 | Conv(dw)/1 | 3 × 3 × 128dw | 28 × 28 × 128 | 28 × 28 × 128 | |
| 8 | Conv/1 | 1 × 1 × 128 × 192 | 28 × 28 × 128 | 28 × 28 × 192 | |
| 9 | Conv(dw)/2 | 3 × 3 × 192dw | 28 × 28 × 192 | 14 × 14 × 192 | |
| 10 | Conv/1 | 1 × 1 × 192 × 384 | 14 × 14 × 192 | 14 × 14 × 384 | |
| 11-15 | Conv(dw)/1 | 3 × 3 × 384dw | 14 × 14 × 384 | 14 × 14 × 384 | |
| | Conv/1 | 1 × 1 × 384 | 14 × 14 × 384 | 14 × 14 × 384 | 1 × 1 × 384 × 603 (cls)/1 × 1 × 384 × 12 (loc) |
| 16 | Conv(dw)/2 | 3 × 3 × 384dw | 14 × 14 × 384 | 7 × 7 × 384 | |
| 17 | Conv/1 | 1 × 1 × 384 × 786 | 7 × 7 × 384 | 7 × 7 × 768 | |
| 18 | Conv(dw)/1 | 3 × 3 × 768dw | 7 × 7 × 768 | 7 × 7 × 768 | |
| 19 | Conv/1 | 1 × 1 × 768 × 786 | 7 × 7 × 768 | 7 × 7 × 768 | 1 × 1 × 768 × 1206 (cls)/1 × 1 × 768 × 24 (loc) |
| 20 | Conv(dw)/2 | 3 × 3 × 768dw | 7 × 7 × 768 | 7 × 7 × 768 | |
| 21 | Conv/1 | 1 × 1 × 768 × 512 | 4 × 4 × 768 | 4 × 4 × 512 | 1 × 1 × 512 × 1206 (cls)/1 × 1 × 512 × 24 (loc) |
| 22 | Conv(dw)/2 | 3 × 3 × 512dw | 4 × 4 × 512 | 4 × 4 × 512 | |
| 23 | Conv/1 | 1 × 1 × 512 × 256 | 2 × 2 × 512 | 2 × 2 × 256 | 1 × 1 × 256 × 1206 (cls/1 × 1 × 256 × 24 (loc) |
| 24 | Conv(dw)/2 | 3 × 3 × 256dw | 2 × 2 × 256 | 1 × 1 × 256 | |
| 25 | Conv/1 | 1 × 1 × 256 × 256 | 1 × 1 × 256 | 1 × 1 × 256 | 1 × 1 × 256 × 1206 (cls)/1 × 1 × 256 × 24 (loc) |

In the entire network implemented according to Table 1, the layers may be connected in order according to their layer numbers. As a type of each layer, a general convolutional layer is denoted as 'Cony', a depthwise convolutional layer is denoted as 'Conv(dw)', and a layer performing maxpooling is denoted as 'Maxpool'. In addition, 2 or 1 is applied as a stride value, and when expressed by 'B×B×C×N', each layer has N filters having a size of B×B and C channels. In addition, when expressed by 'B×B×C', the size of the input image and the size of the output image may mean that the image has a size of B×B and C channels.

Referring to Table 1, the base network in a fast object detection method using an artificial neural network according to an exemplary embodiment of the present disclosure may be configured by connecting the first to fifteenth layers with each other. The base network according to Table 1 is a variation of the existing MobileNetV1, and there may be a difference in replacing the initial layer of the base network with the convolutional layer and the maxpooling layer (layer 2 in Table 1). Changing as shown in Table 1 has the advantage of reducing the number of channels and reducing the overall amount of computation.

That is, the base network according to Table 1 may include the 3×3 convolutional layer and the 2×2 maxpooling layer, and may further include a structure in which the depthwise 3×3 convolutional layer and the 1×1 convolutional layer are sequentially connected as the back end of the 2×2 maxpooling layer. In this case, there may be nine structures (i.e., 3 to 15 of Table 1) each of which has a structure of sequentially connecting the 3×3 depthwise convolutional layer and the 1×1 convolutional layer. In this case, the layers 11 to 15 in Table 1 indicate a structure in which the 3×3 depthwise convolutional layer and the 1×1 convolutional layer are sequentially connected with one number.

The output of the base network in Table 1 may be delivered to the first additional layer and the first detection layer. The first detection layer may be composed of the object classification layer (1×1×384×603, cls) and the object location detection layer (1×1×384×12, loc), which are composed of the 1×1 convolutional layer as shown in Table 1.

In addition, in the first additional layer, the layers 16 to 19 of Table 1 may be sequentially connected with each other. That is, the first additional layer may include two structures each of which has a structure of sequentially connecting the 3×3 depthwise convolutional layer and the 1×1 convolutional layer. The output of the first additional layer may be delivered to the second additional layer and the second detection layer. Referring to Table 1, the second detection layer may be composed of the object classification layer (1×1×768×1206) land the object location detection layer (1×1×768×24), which are composed of the 1×1 convolutional layer.

In addition, in the second additional layer, the layers 20 to 21 of Table 1 may be sequentially connected with each other. That is, the second additional layer may include one structure in which the 3×3 depthwise convolutional layer and the 1×1 convolutional layer are sequentially connected. The output of the second additional layer may be delivered to the third additional layer and the third detection layer. Referring to Table 1, the third detection layer may be composed of the object classification layer (1×1×512×1206) and the object location detection layer (1×1×512×24), which are composed of the 1×1 convolutional layer.

In addition, in the third additional layer, the layers 22 to 23 of Table 1 may be sequentially connected with each other. That is, the third additional layer may include one structure in which the 3×3 depthwise convolutional layer and the 1×1 convolutional layer are sequentially connected. The output of the third additional layer may be delivered to the fourth additional layer and the fourth detection layer. Referring to Table 1, the fourth detection layer may be composed of the object classification layer (1×1×256×1206) and the object location detection layer (1×1×256×24), which are composed of the 1×1 convolutional layer.

In addition, in the fourth additional layer, the layers 24 to 25 of Table 1 may be sequentially connected with each other. That is, the fourth additional layer may include one structure in which the 3×3 depthwise convolutional layer and the 1×1 convolutional layer are sequentially connected. The output of the fourth additional layer may be delivered to the fifth detection layer. Referring to Table 1, the fifth detection layer may be composed of the object classification layer (1×1×256×1206) and the object location detection layer (1×1×256×24), which are composed of the 1×1 convolutional layer.

The output data according to the first to fifth detection layers of Table 1 may be input to the non-max suppression layer according to FIG. 7 to obtain the final detection result.

Figure 8:
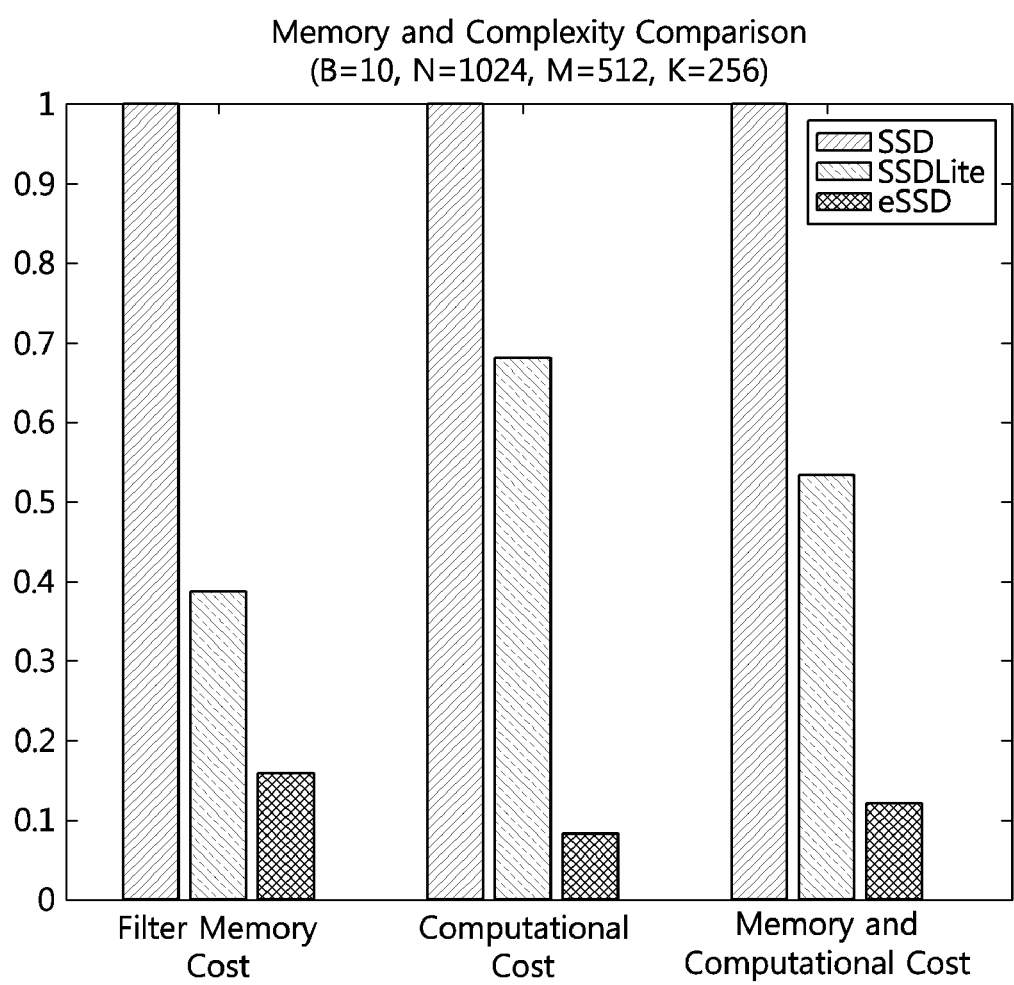
FIGS. 8 to 9 are graphs comparing a memory size and a computation amount of a fast object detection method using an artificial neural network, according to an exemplary embodiment, to those of other methods.
Figure 9:
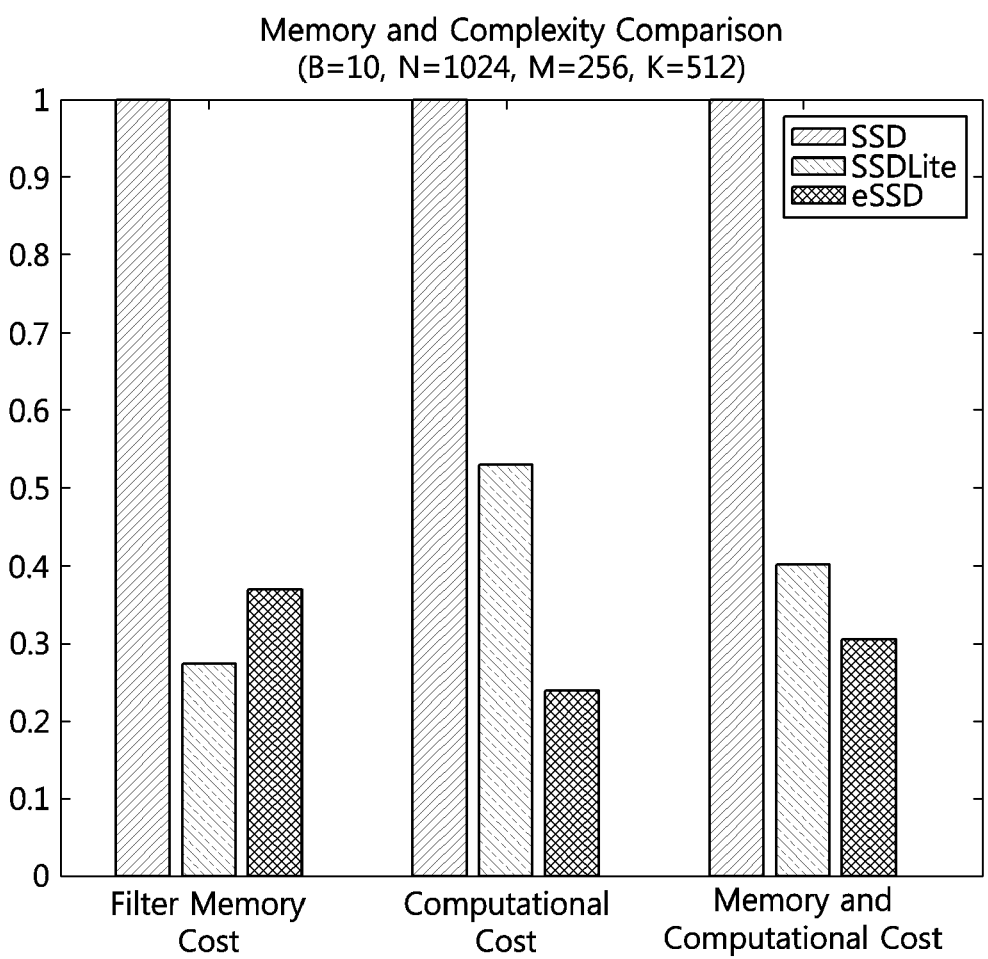

FIGS. 8 to 9 are graphs comparing a memory size and a computation amount of a fast object detection method using an artificial neural network, according to an exemplary embodiment, to those of other methods.

In the single-stage object detection method, the method of detecting an object by configuring additional layers and detection layers according to FIGS. 5 to 7 is referred to as 'eSSD', and when the eSSD is compared with the aforementioned SSD and SSDLite, Table 2 below shows a result of the comparison.

TABLE 2

|  | SSD | SSDLite | eSSD (proposed method) |
|---|---|---|---|
| Addition layers configuration | 1 by 1<br>3 by 3 (stride 2) | 1 by 1<br>Depthwise 3 by 3 (stride 2)<br>1 by 1 | Depthwise 3 by 3 (stride 2)<br>1 by 1 |
| Memory | NM + 9MK | NM + 9M + MK | 9N + NK |
| Computation amount | $NMB^2 + \frac{9MKB^2}{4}$ | $NMB^2 + \frac{9MB^2}{4} + \frac{MKB^2}{4}$ | $\frac{9NB^2}{4} + \frac{MKB^2}{4}$ |

Referring to Table 2, the SSD connects the 1×1 convolutional layer and the 3×3 convolutional layer and uses them as the additional layers, and the SSDLite replaces the 3×3 convolutional layer included in the additional layers of the SSD with the 3×3 depthwise convolutional layer and the 1×1 convolutional layer. In addition, the proposed scheme (i.e., eSSD) according to FIGS. 5 to 7 uses the 3×3 depthwise convolutional layer and the 1×1 convolutional layer as the additional layers.

In this case, in the memory and calculation equation of Table 2, the number of input channels in the additional layer is denoted as N, the number of intermediate output channels is denoted as M, the number of final channels is denoted as K, and the size of the input image is denoted as B×B. A bias is excluded for convenience.

According to the memory size of Table 2, it is expected that the memory size of the eSSD proposed in FIGS. 5 to 7 is the smallest, and the smallest in the calculation amount.

When B=10, N=1024, M=512, and K=256 for the additional layers, ratios of the filter memory usage and convolution computation amount in the other methods (i.e., SSDLite and eSSD) to those in the SSD according to FIG. 4 may be calculated as shown in the graph of FIG. 8. Also, when B=10, N=1024, M=256, and K=512, a comparison graph for a bottleneck case is as shown in FIG. 9. In FIG. 8 and FIG. 9, the memory and computation ratios were calculated by weighting each ratio to 0.5.

Referring to FIGS. 8 and 9, it can be seen that the proposed method eSSD is significantly improved in terms of memory and computation amount compared to the existing SSDs and SSDLite. Specifically, as shown in FIG. 8, the eSSD has about 1/10 less memory and calculation amount than the SSD. In the case of the bottle neck as shown in FIG. 9, it can be seen that the eSSD uses about 1/3 of the memory and calculation amount as compared to the SSD.

In addition to the additional layers, when the 1×1 convolutional layer is used in the detection layers instead of the 3×3 convolutional layer of the SSD or the 3×3 depthwise convolutional layer and the 1×1 convolutional layer of the SSDLite, the effect of reducing the memory size can be achieved. In order to confirm such the effect, a result of comparison of mAP, model size, and inference time of a trained model using MobileNetv1 as a base network and VOC 0712 data as training data is as shown in Table 3 below.

TABLE 3

|  | Baseline (300 by 300) | Additional layers | Detection layers | Performance (mAP) | Model size | Speed (fps) |
|---|---|---|---|---|---|---|
| 1 | MobileNet | SSD | 3 × 3 | 68.6 | 34.8M | 122.5490196 |
| 2 | MobileNet | SSD | 1 × 1 | 67.8 | 23.1M | 128.2051282 |
| 3 | MobileNet | SSDLite | 1 × 1 | 67.8 | 16.8M | 137.9310345 |
| 4 | MobileNet | eSSD (proposed method) | 1 × 1 | 67.9 | 17.4M | 141.843972 |

In Table 3, the detection speeds were measured on Titan X, the batch size was 1, and the additional layers were configured according to FIG. 5 (more specifically, according to Table 1). Referring to Table 3, in the MobileNet used as the base network (or baseline), it can be seen that the eSSD has less memory and faster detection speed while maintaining similar performance as compared to the existing SSD and SSDLite.

FIG. 10 is a flowchart illustrating a fast object detection method using an artificial neural network according to an exemplary embodiment of the present disclosure.

As shown in FIG. 10, a fast object detection method using an artificial neural network may comprise a step S100 of obtaining an input image; a step S110 of inputting the obtained input image into an object detection neural network using a plurality of preset bounding boxes; and a step S120 of detecting an object included in the input image by acquiring output data of the object detection neural network.

The object detection network may include a base network; additional layers for receiving an output of the base network; and detection layers for receiving outputs of the additional layers or the base network.

The base network may be one of VGG, ResNet, ResNeXt, and MobileNet.

The base network may include at least one 3×3 convolutional layer and at least one 2×2 maxpooling layer.

The base network may further include at least one 3×3 depthwise convolutional layer receiving an output of the at least one 2×2 maxpooling layer and at least one 1×1 convolutional layer receiving an output of the at least one 3×3 depthwise convolutional layer.

The additional layers may include at least one 3×3 depthwise convolutional layer and at least one 1×1 convolutional layer connected to an output of the at least one 3×3 depthwise convolutional layer.

The detection layers may include at least one 1×1 convolutional layer detecting a location of the object and at least one 1×1 convolutional layer identifying a type of the object.

In the at least one 3×3 depthwise convolutional layer, a stride value, which is an interval at which convolution is performed, may be set to 2.

The additional layers may include a first additional layer receiving an output of the base network and extracting a feature, and a second additional layer receiving an output of the first additional layer and extracting a feature.

The detection layers may include a first detection layer receiving the output of the base network and identifying a location and a type of the object, and a second detection layer receiving an output of the first additional layer and identify the location and the type of the object.

The first additional layer may include at least two structures each of which has a structure configured by a 3×3 depthwise convolutional layer and a 1×1 convolutional layer connected to an output of the 3×3 depthwise convolutional layer.

FIG. 11 is a block diagram of a fast object detection apparatus using an artificial neural network according to an exemplary embodiment of the present disclosure.

As shown in FIG. 11, a fast object detection apparatus using an artificial neural network 400 may include at least one processor 410 and a memory 420 storing a least one instruction causing the at least one processor to perform at least one step.

The at least one processor 410 may refer to a central processing unit (CPU), a graphics processing unit (GPU), or a dedicated processor on which the methods according to the exemplary embodiments of the present disclosure are performed. Each of the memory 420 and the storage device 460 may be configured as at least one of a volatile storage medium and a nonvolatile storage medium. For example, the memory 420 may be configured with at least one of a read only memory (ROM) and a random access memory (RAM).

Also, the fast object detection apparatus 400 may further include a transceiver 430 performing communications using a wireless or wired network. In addition, the apparatus 400 may further include an input interface device 440, an output interface device 450, a storage device 460, and the like. The components included in the apparatus 400 may be connected by a bus 470 to communicate with each other. However, each component included in the apparatus 400 may be connected to the processor 410 through a separate interface or a separate bus instead of the common bus 470. For example, the processor 410 may be connected to at least one of the memory 420, the transceiver 430, the input interface device 440, the output interface device 450, and the storage device 460 through a dedicated interface.

The at least one step may include a step of obtaining an input image; a step of inputting the obtained input image into an object detection neural network using a plurality of preset bounding boxes; and a step of detecting an object included in the input image by acquiring output data of the object detection neural network.

The object detection network may include a base network; additional layers for receiving an output of the base network; and detection layers for receiving outputs of the additional layers or the base network.

The base network may be one of VGG, ResNet, ResNeXt, and MobileNet.

The base network may include at least one 3×3 convolutional layer and at least one 2×2 maxpooling layer.

The base network may further include at least one 3×3 depthwise convolutional layer receiving an output of the at least one 2×2 maxpooling layer and at least one 1×1 convolutional layer receiving an output of the at least one 3×3 depthwise convolutional layer.

The additional layers may include at least one 3×3 depthwise convolutional layer and at least one 1×1 convolutional layer connected to an output of the at least one 3×3 depthwise convolutional layer.

The detection layers may include at least one 1×1 convolutional layer detecting a location of the object and at least one 1×1 convolutional layer identifying a type of the object.

In the at least one 3×3 depthwise convolutional layer, a stride value, which is an interval at which convolution is performed, may be set to 2.

The additional layers may include a first additional layer receiving an output of the base network and extracting a feature, and a second additional layer receiving an output of the first additional layer and extracting a feature.

The detection layers may include a first detection layer receiving the output of the base network and identifying a location and a type of the object, and a second detection layer receiving an output of the first additional layer and identify the location and the type of the object.

The first additional layer may include at least two structures each of which has a structure configured by a 3×3 depthwise convolutional layer and a 1×1 convolutional layer connected to an output of the 3×3 depthwise convolutional layer.

The apparatus 400 may be implemented as, for example, a desktop computer, a laptop computer, a notebook, a smart phone, a tablet PC, a mobile phone, a smart watch, a smart phone, a portable multimedia player (PMP), a portable game machine, a navigation device, a digital camera, a digital multimedia broadcasting (DMB) player, a digital audio recorder, a digital audio player, a digital video recorder, a digital video player, a personal digital assistant (PDA), or the like, which has a communication capability.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A fast object detection method using an artificial neural network, the fast object detection method comprising:
   obtaining an input image;

inputting the obtained input image into an object detection neural network using a plurality of preset bounding boxes; and detecting an object included in the input image by acquiring output data of the object detection neural network, wherein the object detection network includes:

a base network;

additional layers for receiving an output of the base network, wherein the additional layers include at least one 3×3 depthwise convolutional layer and at least one 1×1 convolutional layer connected to an output of the at least one 3×3 depthwise convolutional layer; and detection layers for receiving outputs of the additional layers or the base network.

2. The fast object detection method according to claim 1, wherein the base network is one of VGG, ResNet, ResNeXt, and MobileNet.

3. The fast object detection method according to claim 1, wherein the base network includes at least one 3×3 convolutional layer and at least one 2×2 maxpooling layer.

4. The fast object detection method according to claim 3, wherein the base network further includes at least one 3×3 depthwise convolutional layer receiving an output of the at least one 2×2 maxpooling layer and at least one 1×1 convolutional layer receiving an output of the at least one 3×3 depthwise convolutional layer.

5. The fast object detection method according to claim 1, wherein the detection layers include at least one 1×1 convolutional layer detecting a location of the object and at least one 1×1 convolutional layer identifying a type of the object.

6. The fast object detection method according to claim 1, wherein in the at least one 3×3 depthwise convolutional layer, a stride value, which is an interval at which convolution is performed, is set to 2.

7. The fast object detection method according to claim 1, wherein the additional layers include a first additional layer receiving an output of the base network and extracting a feature, and a second additional layer receiving an output of the first additional layer and extracting a feature.

8. The fast object detection method according to claim 7, wherein the detection layers include a first detection layer receiving the output of the base network and identifying a location and a type of the object, and a second detection layer receiving an output of the first additional layer and identify the location and the type of the object.

9. The fast object detection method according to claim 7, wherein the first additional layer includes at least two structures each of which has a structure configured by a 3×3 depthwise convolutional layer and a 1×1 convolutional layer connected to an output of the 3×3 depthwise convolutional layer.

10. A fast object detection apparatus using an artificial neural network, the fast object detection apparatus comprising at least one processor and a memory storing at least one instruction executable by the at least one processor, wherein when executed by the at least one processor, the at least one instruction configures the at least one processor to:

obtain an input image;

input the obtained input image into an object detection neural network using a plurality of preset bounding boxes; and detect an object included in the input image by acquiring output data of the object detection neural network, and wherein the object detection network includes:

a base network;

additional layers for receiving an output of the base network, wherein the additional layers include at least one 3×3 depthwise convolutional layer and at least one 1×1 convolutional layer connected to an output of the at least one 3×3 depthwise convolutional layer; and detection layers for receiving outputs of the additional layers or the base network.

11. The fast object detection apparatus according to claim 10, wherein the base network is one of VGG, ResNet, ResNeXt, and MobileNet.

12. The fast object detection apparatus according to claim 10, wherein the base network includes at least one 3×3 convolutional layer and at least one 2×2 maxpooling layer.

13. The fast object detection apparatus according to claim 12, wherein the base network further includes at least one 3×3 depthwise convolutional layer receiving an output of the at least one 2×2 maxpooling layer and at least one 1×1 convolutional layer receiving an output of the at least one 3×3 depthwise convolutional layer.

14. The fast object detection apparatus according to claim 10, wherein the detection layers include at least one 1×1 convolutional layer detecting a location of the object and at least one 1×1 convolutional layer identifying a type of the object.

15. The fast object detection apparatus according to claim 10, wherein in the at least one 3×3 depthwise convolutional layer, a stride value, which is an interval at which convolution is performed, is set to 2.

16. The fast object detection apparatus according to claim 10, wherein the additional layers include a first additional layer receiving an output of the base network and extracting a feature, and a second additional layer receiving an output of the first additional layer and extracting a feature.

17. The fast object detection apparatus according to claim 16, wherein the detection layers include a first detection layer receiving the output of the base network and identifying a location and a type of the object, and a second detection layer receiving an output of the first additional layer and identify the location and the type of the object.

18. The fast object detection apparatus according to claim 16, wherein the first additional layer includes at least two structures each of which has a structure configured by a 3×3 depthwise convolutional layer and a 1×1 convolutional layer connected to an output of the 3×3 depthwise convolutional layer.

* * * * *